United States Patent Office.

ALBERT BAUR, OF MULHOUSE, GERMANY, ASSIGNOR TO FABRIQUES DE PRODUITS CHIMIQUES DE THANN & DE MULHOUSE, OF THANN, GERMANY.

PROCESS OF SEPARATING ORTHOTOLUENESULFOCHLORID.

SPECIFICATION forming part of Letters Patent No. 692,598, dated February 4, 1902.

Application filed July 9, 1901. Serial No. 67,577. (No specimens.)

*To all whom it may concern:*

Be it known that I, ALBERT BAUR, a citizen of the Swiss Republic, residing at Mulhouse, Germany, have invented certain new and useful Improvements in the Manufacture of Orthotoluenesulfochlorid, the Parent Material of Saccharin, of which the following is a clear and complete specification.

It is well known that by the action of sulfonic acid on toluene a mixture of ortho and para toluenesulfonic acid is formed. From this mixture the para acid may be separated according to Dr. Lange's German Patent, No. 57,391, of September 23, 1890, a patent which is now void, by addition of a small quantity of water or ice. The mother-liquors contain a very small quantity of para acid, all the ortho acid, and the sulfuric acid used in excess of the theoretical quantity. By treatment with lime, filtration of the sulfate of lime, transformation of the lime sulfonate in the corresponding sodium salt, evaporation of the latter to dryness, and further treatment with pentachlorid of phosphorus the orthotoluenesulfochlorid may be obtained. This process is very expensive, and the orthosulfochlorid thus obtained is not absolutely pure. I have considerably improved the said process and have made it to an industrial one by two new and useful reactions, viz: First, I have first succeeded in separating the orthotoluenesulfonic mother-liquors in a perfectly pure state by adding to them a further quantity of water and allowing the liquor thus obtained to stand for a certain and rather long time at a low temperature; second, I secondly transform the orthotoluenesulfonic acid thus obtained in a salt, preferably the magnesium salt, and I act on this in an absolutely dry state with chlorosulfonic acid ($SO_3HCl$) and transform it by this way in orthotoluenesulfochlorid, which is a quite new reaction hitherto unknown.

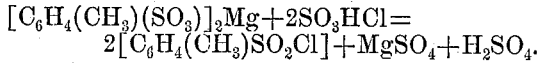

The following example may be given as an illustration of my invention: To four hundred kilos of sulfuric acid of 66° Baumé I add, while continually stirring the liquid, one hundred and eighty-four kilos of toluene and two hundred and fifty kilos of fuming sulfuric acid containing twenty-five per cent. of $SO_3$, and by cooling I maintain the temperature of the mixture at about 14° to 16° centigrade. After having allowed the liquid to stand for a certain time I add slowly about one hundred and forty kilos of cold water or ice, the temperature being kept always under 20° centigrade. The paratoluenesulfonic acid is then separated in a crystalline state and cabe easily filtered. It may be hydrolized with dilute sulfuric acid separated from the orthotoluenesulfonic acid in the way which will be described afterward, and the toluene thus regenerated can be used for a further sulfonation. In order to isolate the orthotoluenesulfonic acid, I add to the liquor filtered from the paratoluenesulfonic acid about one hundred and forty kilos of water, and I allow it to stand for at least forty-eight hours at a low temperature 5° below zero, or about so. The orthotoluenesulfonic acid then separates out in voluminous crystals, which are filtered. The mother-liquors, which contain a little para and ortho sulfo acid of toluene and the excess of sulfuric acid, may be used for the hydrolysis of the above-mentioned paratoluenesulfonic acid, and the more dilute sulfuric acid thus resulting can be utilized for the manufacture of superphosphate or in any other convenient manner.

The orthotoluenesulfonic acid retains a certain amount of sulfuric acid. In order to eliminate the latter, this ortho acid is dissolved in water and heated with the required quantity of lime, which combines with the sulfuric acid, forming insoluble sulfate of lime. The solution obtained after filtering contains now the pure orthotoluenesulfonic acid. It is saturated with carbonate of magnesia, evaporated to dryness, and the magnesium salt heated at 110° to 120° centigrade. In order to prepare, now, the sulfochlorid, two hundred and fifty kilos of the dry magnesium salt, finely powdered, are slowly poured into twelve hundred and fifty kilos of chlorosulfonic acid, ($SO_3HCl$) while always stirring and cooling outside, so that the temperature does not exceed 15° to 18° centigrade. After a few hours the reaction is finished. The mixture is poured on about one thousand kilos of ice and the pure orthotoluenesulfochlorid separated from the aqueous liquid.

What I claim is—

1. An improvement in the manufacture of orthotoluenesulfochlorid, which consists in separating pure orthotoluenesulfonic acid from a solution of the same in sulfuric acid by addition of a small quantity of water and action of a low temperature.

2. An improvement in the manufacture of orthotoluenesulfochlorid, which consists in acting with chlorosulfonic acid ($SO_3Cl$) on a salt of orthotoluenesulfonic acid, at a temperature not exceeding 15° to 18° centigrade.

3. An improvement in the manufacture of orthotoluenesulfochlorid which consists in acting with chlorosulfonic acid ($SO_3Cl$) on the magnesium salt of orthotoluenesulfonic acid at a temperature not exceeding 15° to 18° centigrade.

4. An improvement in the manufacture of orthotoluenesulfochlorid, which consists in separating pure orthotoluenesulfonic acid from a solution of the same in sulfuric acid by addition of a small quantity of water and action of a low temperature, transforming the orthotoluenesulfonic acid thus obtained into a corresponding metallic salt and finally acting on this salt of orthotoluenesulfonic acid with chlorosulfonic acid ($SO_3Cl$), at a temperature not exceeding 15° to 18° centigrade.

In witness whereof I have hereunto signed my name in the presence of two subscribing witnesses.

ALBERT BAUR.

Witnesses:
GEO. GIFFORD,
AMAND RITTER.